(12) United States Patent
Matsuo

(10) Patent No.: US 8,119,301 B2
(45) Date of Patent: Feb. 21, 2012

(54) COOLING SYSTEM FOR FUEL CELL STACK SHUTDOWN

(76) Inventor: Shiro Matsuo, Tochigi (JP)

( * ) Notice: Subject to any disclaimer, the term of this patent is extended or adjusted under 35 U.S.C. 154(b) by 1004 days.

(21) Appl. No.: 12/032,886

(22) Filed: Feb. 18, 2008

(65) Prior Publication Data

US 2009/0208796 A1   Aug. 20, 2009

(51) Int. Cl.
*H01M 8/04* (2006.01)
(52) U.S. Cl. ........................ 429/436; 429/434
(58) Field of Classification Search ........... 429/434–436
See application file for complete search history.

(56) References Cited

U.S. PATENT DOCUMENTS

| | | | |
|---|---|---|---|
| 5,537,956 A * | 7/1996 | Rennfeld et al. | 123/41.29 |
| 6,391,485 B1 | 5/2002 | Perry | |
| 6,858,336 B2 | 2/2005 | Reiser et al. | |
| 6,939,633 B2 * | 9/2005 | Goebel | 429/415 |
| 7,090,940 B2 | 8/2006 | Schrooten et al. | |
| 2006/0040150 A1 | 2/2006 | Yu et al. | |
| 2007/0015018 A1 | 1/2007 | Tsutsui | |
| 2007/0031713 A1 | 2/2007 | Cho et al. | |
| 2007/0128474 A1 | 6/2007 | Bach et al. | |

\* cited by examiner

*Primary Examiner* — Patrick Ryan
*Assistant Examiner* — Muhammad Siddiquee
(74) *Attorney, Agent, or Firm* — Porter Wright Morris & Arthur LLP

(57) ABSTRACT

A cooling system for the shutdown process in a fuel cell powered vehicle system for eliminating the detrimental effects of voltage persistence in the fuel cell including a volume of fluid coolant at ambient temperature, a pump, a fluid circuit interconnecting the pump and the coolant reservoir with a section of a cooling system that circulates through the vehicle fuel cell stack, and a controllable valve system whereby, at the occurrence of vehicle shutdown, the ambient temperature fluid in the reservoir is directed to a section of a cooling system that circulates through the vehicle fuel cell stack.

5 Claims, 4 Drawing Sheets

VEHICLE IN OPERATION

VEHICLE AT SHUT DOWN

COOLING SYSTEM FOR FUEL CELL STACK SHUTDOWN

FIELD OF THE INVENTION

The present invention relates to a cooling system for a fuel cell stack, operative at the time of shutdown, to reduce corrosion in the membrane and electrode assembly of the fuel cell caused by residual voltage generation effects.

BACKGROUND OF THE INVENTION

In fuel cells, when the electrical circuit leading to a powered device, such as an automobile drive system, is opened during shut down of the cell and the cell is relieved of an electrical load, the presence of air on the cathode, coupled with hydrogen fuel remaining on the anode, causes unacceptable anode and cathode potentials, resulting in corrosion in the catalyst and the catalyst assembly support and consequent degradation of the cell assembly and the cell performance. Conventionally, an inert gas is used to purge both the anode flow field and the cathode flow field immediately upon cell shut-down to dissipate electrical potential at the anode and cathode. In a motor vehicle, an on board supply of inert gas such as nitrogen for use in the shut down purge adds weight and cost and may interfere with vehicle shut-down and start-up procedures.

In another aspect of a fuel cell system shut down procedure, hydrogen at the anode side, air at the cathode side, and generated water remain after shut down when the power consuming circuit is disconnected. An open circuit voltage occurs between the anode and cathode (about 1 volt for each cell) and remains until the residual fuel, hydrogen, and air are consumed. A post shut down prolonged voltage damages the membrane and electrode assembly (MEA). The voltage causes the platinum catalyst at the cathode side of the cell to be ionized; the platinum migrates into the membrane and generates radical or charged molecular elements that damage the molecular structure of the membrane.

In one proposed solution, the hydrogen remaining at the anode side is consumed to generate electricity, which is charged to a capacitor through a voltage converter. Remaining water at the cathode side is blown off with air by a pump. When the vehicle water pump is stopped, coolant remains in the fuel cell stack and cooling system, but, nevertheless, some hydrogen still remains at the anode side and produces a persistent voltage after a lapse of several hours. The persistent voltage in an inoperative cell will cause membrane damage. U.S. Pat. No. 6,858,336, Procedure for Shutting Down a Fuel Cell System Using Air Purge, proposes to shut down an operating fuel cell system by disconnecting the primary load device, stopping the flow of hydrogen fuel to the anode, and displacing the fuel remaining in the anode fuel flow field with air by blowing air through the anode fuel flow field. The '336 patent terminates the hydrogen flow and quickly displaces the remaining hydrogen by blowing air through the anode field at shut down. Generated heat in the fuel cell that causes hydrogen and air to react at the mixture front may cause some damage locally when this procedure is employed.

U.S. Pat. No. 6,391,485, Method and Apparatus for Purging a Fuel Cell System With Coolant, describes a fuel cell startup-shutdown method and apparatus for purging a fuel cell stack with coolant, typically water, during the transient operations of start-up and shutdown [Column 6, lines 27-43; Column 2, lines 43-46]. U.S. Pat. No. 7,090,940, Freeze Tolerant Fuel Cell Power Plant With a Direct Contact Heat Exchanger, relates to a freeze tolerant fuel cell and discloses a power plant including a coolant inlet and a coolant outlet for directing a coolant to flow through the fuel cell during a shutdown. [Column 2, lines 28-31; Column 6, lines 32-48]. Publication Number 2006/0040140, Yu et al., Feb. 23, 2006 and Publication Number 2007/0015018, Tsutsui, Jan. 18, 2007, describe systems for reducing the temperature of a fuel cell stack during the shutdown process. Publication Number 2007/0031713, Cho et al., Feb. 8, 2007, and Publication Number 2007/0128474, Bach et al., Jun. 7, 2007, respectively, relate to fuel cell cooling systems to reduce corrosion and cool the hydrogen gas flow, not the fuel cell itself, and to a system to provide cooling to reduce hydrogen depletion.

OBJECTS OF THE INVENTION

It is an object of the present invention to provide a cooling system for the shut down operation of a vehicle fuel cell. It is a further object to minimize voltage persistence in the fuel cell causing the catalyst migration phenomenon that results from the combined hydrogen, air, water and hot condition existing in the fuel cell at shutdown. The hot condition makes the catalyst active and causes a voltage potential between the anode and cathode which forces the catalyst migration into the fuel cell membrane.

The cooling system of the invention eliminates voltage persistence by immediately cooling stack temperature to ambient level, thereby eliminating a temperature differential that produces a persistent voltage that corrodes the cells and reduces effective cell life. In brief, the invention provides a secondary coolant reservoir which contains an amount of liquid coolant at ambient temperature. The invention cools a fuel cell at shutdown, when, at shutdown, a pump is actuated to move the coolant fluid in the reservoir (which is stored at ambient temperature) to the fuel cell stack. The coolant, in turn, cools the stack assembly and mitigates the detrimental effects of catalytic activity caused by a temperature differential.

The invention is described more fully in the following description of the preferred embodiment considered in view of the drawings in which:

DETAILED DESCRIPTION OF THE INVENTION

The invention provides a cooling system for vehicle fuel cell stacks that eliminates the hot condition in the fuel cell just after shut down and mitigates the catalyst active effect that causes degradation of the fuel cell assembly components. In the invention, the fuel cell cooling system is provided with a secondary cooling circuit with a reservoir which has a high heat dissipation wall. When the fuel cell powered vehicle is running and consuming fuel cell power, the coolant in the second reservoir is cooled to ambient temperature. After shut down of the generation of electricity by the fuel cell stack, a water pump moves the coolant from the supplemental reservoir into the fuel cell stack to replace the typically hot, conventional, fuel cell coolant quickly. Thus, the temperature of the fuel cell catalyst component is decreased to ambient temperature immediately; there is no heat or temperature difference between the stack and ambient temperature and residual voltage production ceases. Instantaneous cooling mitigates catalyst activity, high voltage occurrence, and membrane deterioration.

The shut down coolant (preferably water) in the supplemental reservoir is cooled during vehicle parking and running until needed for the next fuel cell shut down procedure. The system of the invention comprises a reservoir, water pump, and water pump controller interconnected with the fuel cell stack components and vehicle control system to provide a quick temperature cool down of the fuel cell assembly, particularly the catalyst, after shut down of the vehicle and fuel cell. The secondary coolant reservoir contains an ambient temperature liquid coolant that cools a fuel cell at shutdown. The pump is actuated at shutdown to cause the flow of the ambient temperature coolant fluid in the reservoir to the fuel cell stack. In turn, the stack is cooled and the detrimental effects of catalytic activity caused by a temperature differential are mitigated.

Figure 1:
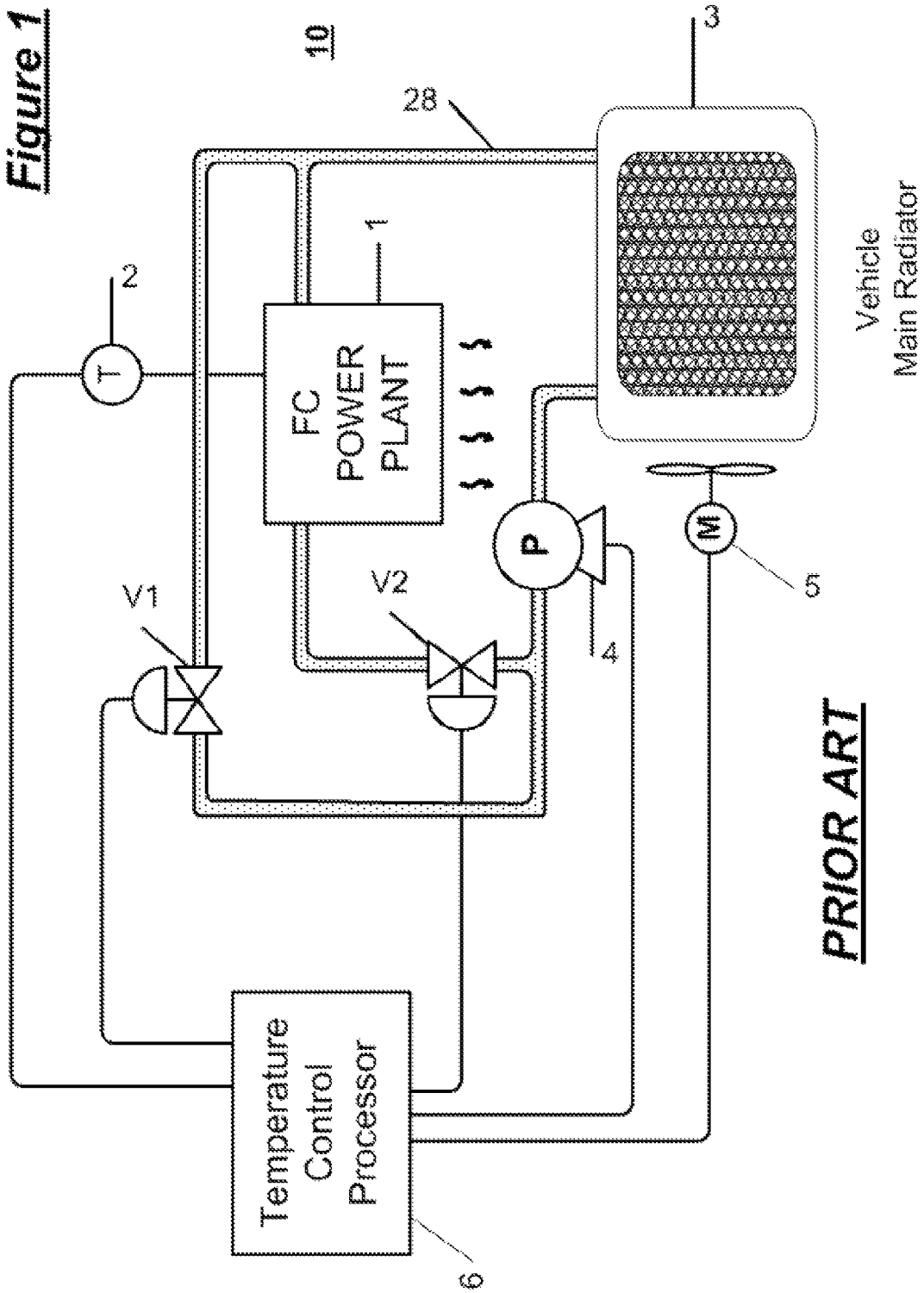
FIG. 1 is a schematic of a conventional fuel cell power plant and cooling system as the plant and cooling system are interrelated with the main vehicle radiator.

With reference to FIG. 1, a conventional fuel cell power plant 1 and cooling system, as the plant and cooling system are interrelated with the main vehicle radiator, are shown. Typically, the fuel cell power plant 1 is interconnected with a temperature control processor 6 that monitors fuel cell heat, for example sensed by thermostat 2, and regulates the flow of primary vehicle coolant through a series of pump[s] 4, valves V1 and V2, and radiator system 3 (with fan 5) to maintain the power plant and cell assembly at an optimum temperature.

Figure 2:
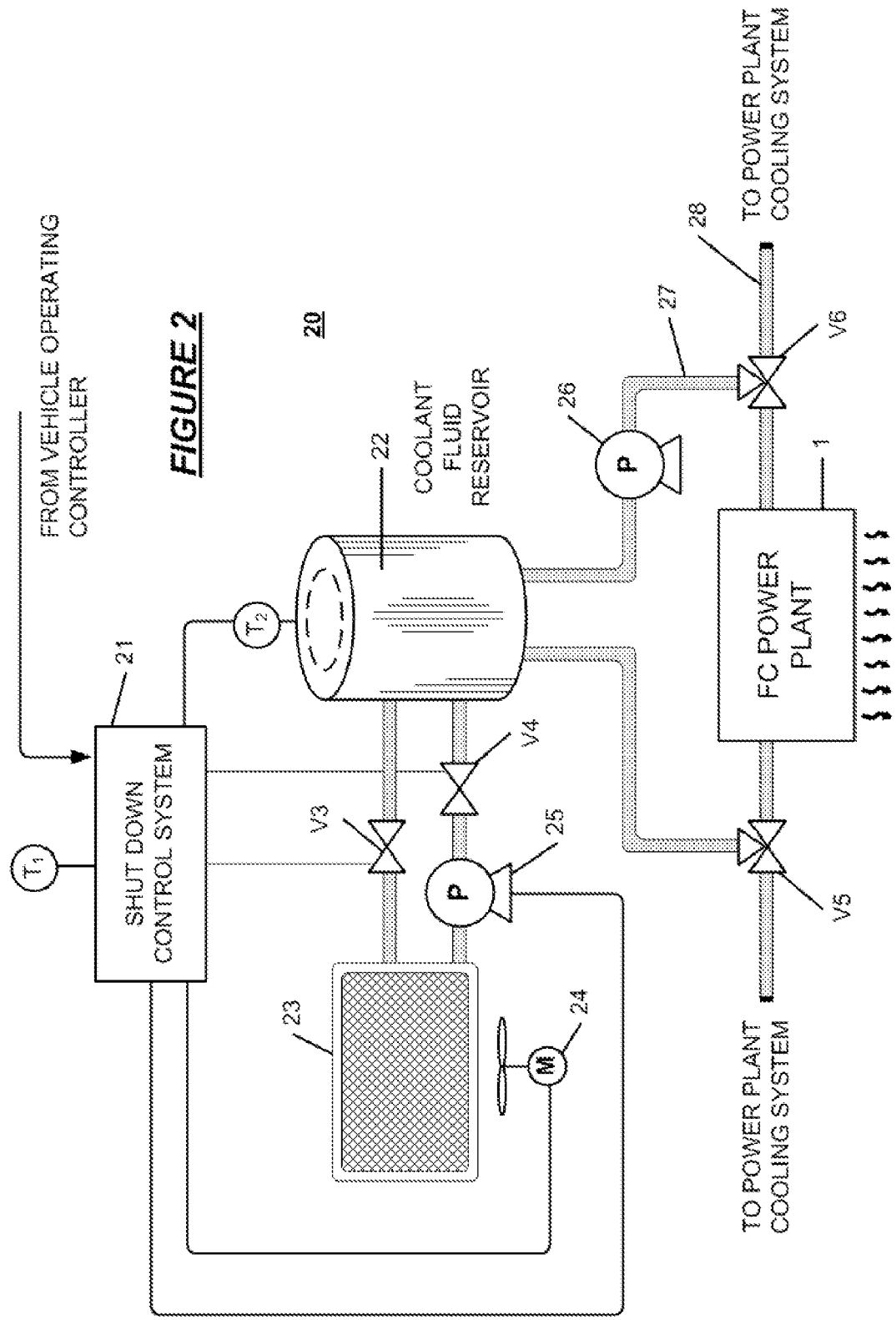
FIG. 2 depicts the cooling system of the invention and related components that comprise the system.

The cooling system of the invention and related components that comprise the system assembly are shown in FIG. 2. The cooling system 20 for shutdown comprises a coolant fluid reservoir 22 which contains a volume of liquid coolant at ambient temperature, a water pump 26, a fluid conduit path 27 interconnecting the pump and the coolant reservoir with the fuel cell cooling system 28, at least one controllable valve in the fluid circuit, the two way valves V5 and V6 are shown in a preferred embodiment, and a shutdown control system 21 interrelated with the fuel cell control system (not shown) and the at least one valve V5, V6 and pump 26. During the condition of power plant operation, the at least one valve is maintained in a closed position to isolate the shutdown system and to prevent flow of the supplemental coolant into the power plant cooling system.

During vehicle operation, the pump in the fluid circuit is in an off condition, and the temperature of the fluid in the reservoir is maintained at ambient temperature. Temperature of the coolant is maintained by thermostat $T_1$ interconnected with the shutdown control system 21 which may regulate coolant temperature through radiator/heat exchanger 23, and opening and closing valves V3 and V4 and flow pump 25 interconnected in the coolant flow feed to the reservoir 22. The radiator 23, pump 25 and valve system V3 and V4 are aspects of an embodiment complementary to the coolant flow of ambient temperature fluid into the fuel cell. Upon receiving a signal from the fuel cell control system or vehicle operating controller that the fuel cell will be shutdown, the shutdown control system actuates the pump 26 and the at least one valve, in the instance shown V5 and V6, into an open position to allow flow into the power plant cooling circuit 28 and the ambient temperature coolant fluid in the reservoir is directed to the fuel cell stack, to, in turn, cool the stack to mitigate the detrimental effects of catalytic activity caused by a temperature differential upon system shutdown. When flow from the reservoir is activated at shutdown, coolant flow in the power plant cooling system to the fuel cell is terminated by valves V5 and V6 which are in a closed position with respect to cooling system flow through conduit 28.

Figure 3:
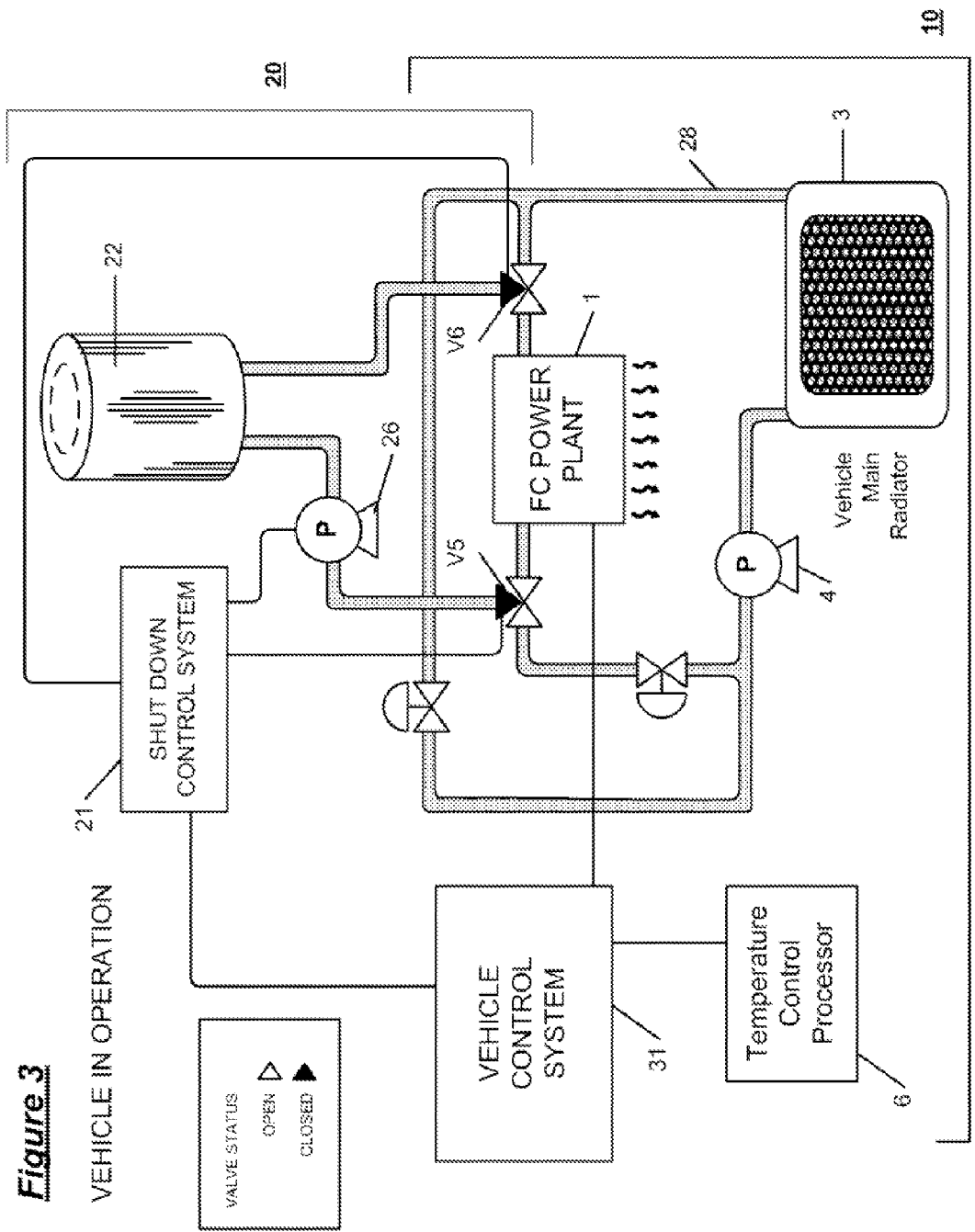
FIG. 3 is a schematic drawing of a cooling system of the invention and the relationship of the system of the invention to the vehicle power plant system while the vehicle is operating.

FIG. 3 is a schematic drawing of a cooling system of the invention and the relationship of the system to the vehicle power plant and the main vehicle radiator system while the vehicle is operating. As shown, the two way valves V5 and V6 are open to permit vehicle and fuel cell cooling to occur through the vehicle main vehicle cooling system 10, radiator 3 and cooling conduit path 28, allowing vehicle operation to proceed. Shutdown cooling system 20 is isolated from the main system as valves V5 and V6 are closed in the direction of pump 26 and reservoir 22 such as to isolate the supplemental cooling system 20 from the main system 10.

Figure 4:
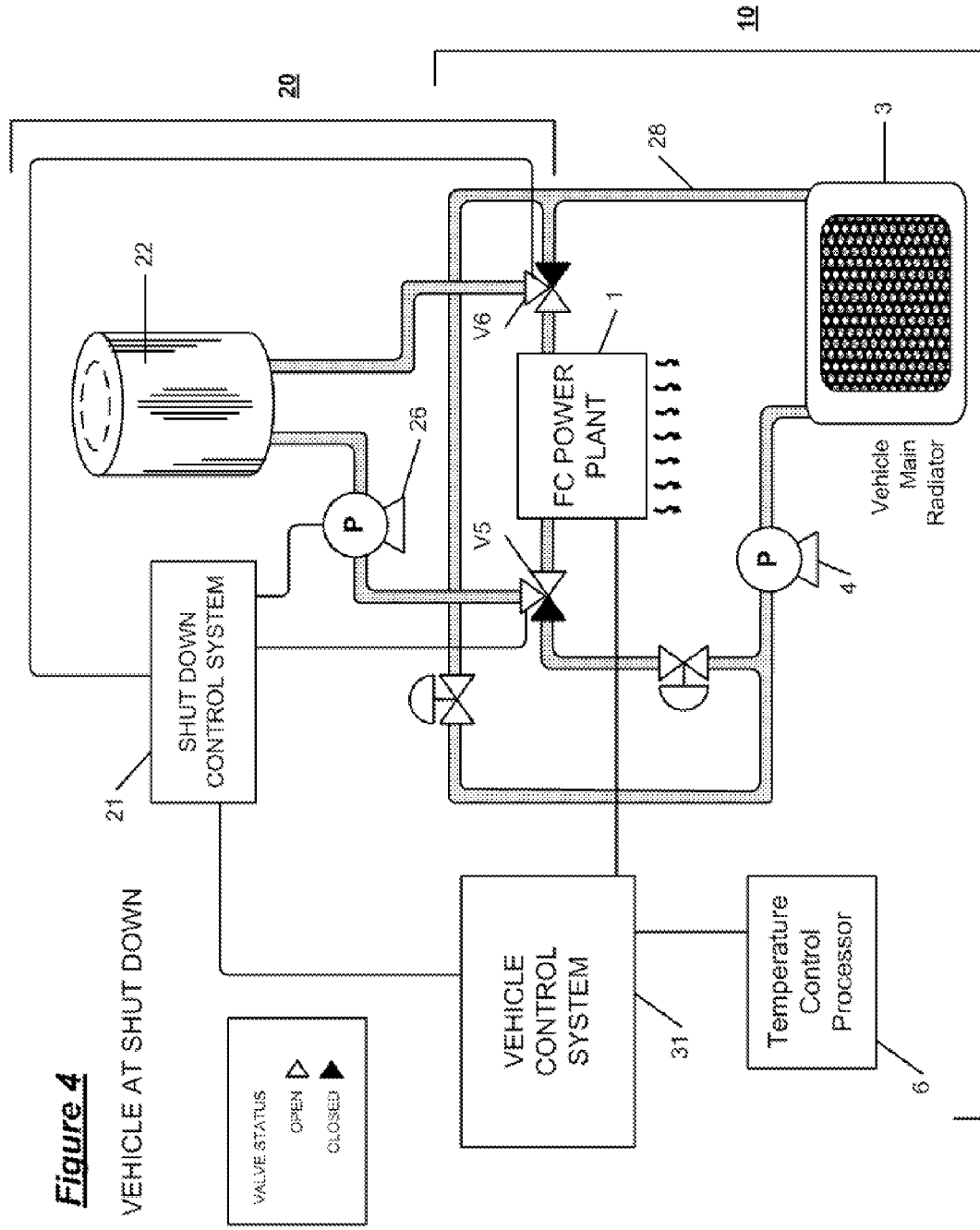
FIG. 4 is a schematic drawing of the cooling system of the invention as engaged with the fuel cell during the shutdown process for the vehicle fuel cell power plant.

At shut down, the shut down control system 21 deactivates the main cooling system 10 and activates the supplemental system 20. FIG. 4 illustrates that the cooling system of the invention during the shutdown process for the vehicle fuel cell power plant is activated by switching valves V5 and V6 into an open position with respect to flow from reservoir 22 whereby the stored ambient temperature fluid from 22 is directed to flow by pump 26 into and through fuel cell cooling conduit 28. Valves V5 and V6 are switched into a closed position with respect to the main cooling system 10. Ambient temperature coolant thus flows in a loop from reservoir 22 through pump 26 through valve V5 to conduit 28 into the power plant fuel cell 1 and returns through valve V6 to the reservoir 22. It is evident that the open and closed positions of valves V5 and V6 with respect to coolant conduit 28 in the main cooling system may be regulated as well by the vehicle control system 31 simultaneously with a start up or shutdown signal generated for the vehicle. There is thus no flow in system 10 conduit 28 as connected to radiator 28 and pump 4 at shutdown; coolant flow occurs in system 20 through conduit 28 at shutdown.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A cooling system for the shutdown process in a fuel cell powered vehicle comprising a secondary coolant reservoir which contains a volume of secondary fluid coolant at ambient temperature, a pump, a fluid circuit interconnecting the pump and the secondary coolant reservoir with a section of a main cooling system that circulates primary coolant through the vehicle fuel cell stack during power plant operation, at least one controllable valve for regulating secondary coolant flow into the section of the main cooling system, and a control system interrelated with the at least one valve and pump, wherein during the vehicle condition of power plant operation, the at least one valve is maintained in a closed position, the pump in the fluid circuit is in an off condition, and the temperature of the fluid in the reservoir is maintained at ambient temperature, such that upon receiving a fuel cell shutdown signal from, the control system actuates the pump and the at least one valve whereby the secondary fluid coolant flows through the section of the primary cooling system such that the secondary coolant fluid circulates through the vehicle fuel cell stack and, in turn, cools the stack.

2. The cooling system of claim 1 comprising a pair of said controllable valves providing fluid communication between said secondary coolant reservoir and said section of the main cooling system, said controllable valves allowing in a first position flow of primary coolant through the fuel cell stack and preventing the flow of secondary coolant fluid from the secondary coolant reservoir into the fuel cell, and allowing in a second position the flow of secondary coolant fluid from the secondary coolant reservoir into the fuel cell and preventing the flow of main coolant through the fuel cell stack.

3. The cooling system of claim 2 wherein the pair of controllable valves are disposed at opposite ends of a fluid flow conduit path leading into and from the main cooling system.

4. A cooling system for eliminating voltage persistence in the fuel cell stack of a motor vehicle by immediately cooling stack temperature upon the occurrence of vehicle shutdown, comprising:

a secondary coolant reservoir which contains an amount of a secondary liquid coolant at ambient temperature;

a pair of valves for controlling coolant flow into and from the fuel cell stack; and a control system that controls the two way valves such that, in a first position, said valves allow a flow of primary coolant from the main vehicle cooling system through the fuel cell stack and prevent the flow of secondary coolant from the secondary coolant reservoir into the fuel cell, and, in a second, vehicle shutdown position, said valves allow the flow of secondary coolant from the secondary coolant reservoir into the fuel cell stack and prevent the flow of primary coolant from the main vehicle cooling system through the fuel cell stack.

5. The cooling system of claim 4 including a heat exchanger and a valve system interconnected in a fluid flow circuit into and from the secondary coolant reservoir wherein the temperature of the secondary coolant is maintained at ambient temperature by flowing secondary coolant through said heat exchanger.

\* \* \* \* \*